US012578737B2

(12) United States Patent \
Stählin

(10) Patent No.: US 12,578,737 B2 \
(45) Date of Patent: Mar. 17, 2026

(54) METHOD FOR AUTOMATICALLY CONTROLLING A VEHICLE

(71) Applicant: Continental Automotive Technologies GmbH, Hannover (DE)

(72) Inventor: Ulrich Stählin, Eschborn (DE)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 64 days.

(21) Appl. No.: 18/556,805

(22) PCT Filed: Mar. 16, 2022

(86) PCT No.: PCT/DE2022/200043 \
§ 371 (c)(1), \
(2) Date: Oct. 23, 2023

(87) PCT Pub. No.: WO2022/223081 \
PCT Pub. Date: Oct. 27, 2022

(65) Prior Publication Data

US 2024/0134392 A1     Apr. 25, 2024 \
US 2024/0231386 A9     Jul. 11, 2024

(30) Foreign Application Priority Data

Apr. 23, 2021     (DE) ..................... 10 2021 204 049.7

(51) Int. Cl. \
*G05D 1/646*          (2024.01) \
*G05D 1/226*          (2024.01) \
*G05D 1/80*           (2024.01) \
*H04W 4/44*           (2018.01)

(52) U.S. Cl. \
CPC ............. *G05D 1/646* (2024.01); *G05D 1/226* (2024.01); *G05D 1/80* (2024.01); *H04W 4/44* (2018.02)

(58) Field of Classification Search \
CPC .......... G05D 1/646; G05D 1/80; G05D 1/226; H04W 4/44 \
USPC ........................................................... 701/23 \
See application file for complete search history.

(56) References Cited

U.S. PATENT DOCUMENTS

| | | | |
|---|---|---|---|
| 2017/0313306 A1* | 11/2017 | Nordbruch ............ | B60W 30/06 |
| 2017/0351267 A1 | 12/2017 | Mielenz | |
| 2018/0107220 A1* | 4/2018 | Nordbruch ............. | G05D 1/021 |
| 2020/0097009 A1* | 3/2020 | Garg ...................... | G05D 1/646 |
| 2021/0089024 A1* | 3/2021 | Nordbruch ........... | G05D 1/0016 |

(Continued)

FOREIGN PATENT DOCUMENTS

| | | | | |
|---|---|---|---|---|
| CN | 107063711 A | * | 8/2017 | .......... G01M 17/007 |
| DE | 102014224077 A1 | | 6/2016 | |

(Continued)

OTHER PUBLICATIONS

English Translation for CN107063711A (Year: 2025).*

(Continued)

*Primary Examiner* — Mahmoud S Ismail

(57) ABSTRACT

A method for automatically controlling a vehicle based on a driving specification received from an external infrastructure. In a normal mode the vehicle is controlled along a trajectory specified thereby and in a test mode the vehicle is controlled along a test trajectory that deviates from the trajectory specified by the driving specification, and/or is controlled using test parameters. This allows the reliable operation of the infrastructure to be verified.

13 Claims, 1 Drawing Sheet

(56) References Cited

U.S. PATENT DOCUMENTS

2021/0311471 A1* 10/2021 Gogna ................... G05D 1/226
2022/0281456 A1*  9/2022 Giovanardi .......... G08G 1/0112

FOREIGN PATENT DOCUMENTS

| | | | |
|---|---|---|---|
| DE | 102015201209 | A1 | 7/2016 |
| DE | 102015208062 | A1 | 11/2016 |
| JP | H10325860 | A | 12/1998 |
| JP | 2018515841 | A | 6/2018 |
| JP | 2019109675 | A | 7/2019 |
| JP | 2020109668 | A | 7/2020 |
| WO | 2019082273 | A1 | 5/2019 |

OTHER PUBLICATIONS

German Search Report dated Nov. 30, 2021 for the priority German Patent Application No. 10 2021 204 049.7.
The International Search Report and the Written Opinion of the International Searching Authority mailed on May 27, 2022 for the PCT Application No. PCT/DE2022/200043 which this application claims priority.
Canadian Office Action dated Jan. 6, 2025 for the counterpart Canadian Patent Application No. 3,216,675.
Office Action exhibited on Sep. 4, 2024 from corresponding Japanese patent application No. 2023-562779.
Korean Office Action dated Jun. 26, 2025 for the counterpart Korean Patent Application No. 10-2023-7035790 and machine translation of same.
Decision to Grant a Patent mail date May 21, 2025 for the counterpart Japanese Patent Application No. 2023 562779 and machine translation of same.

* cited by examiner

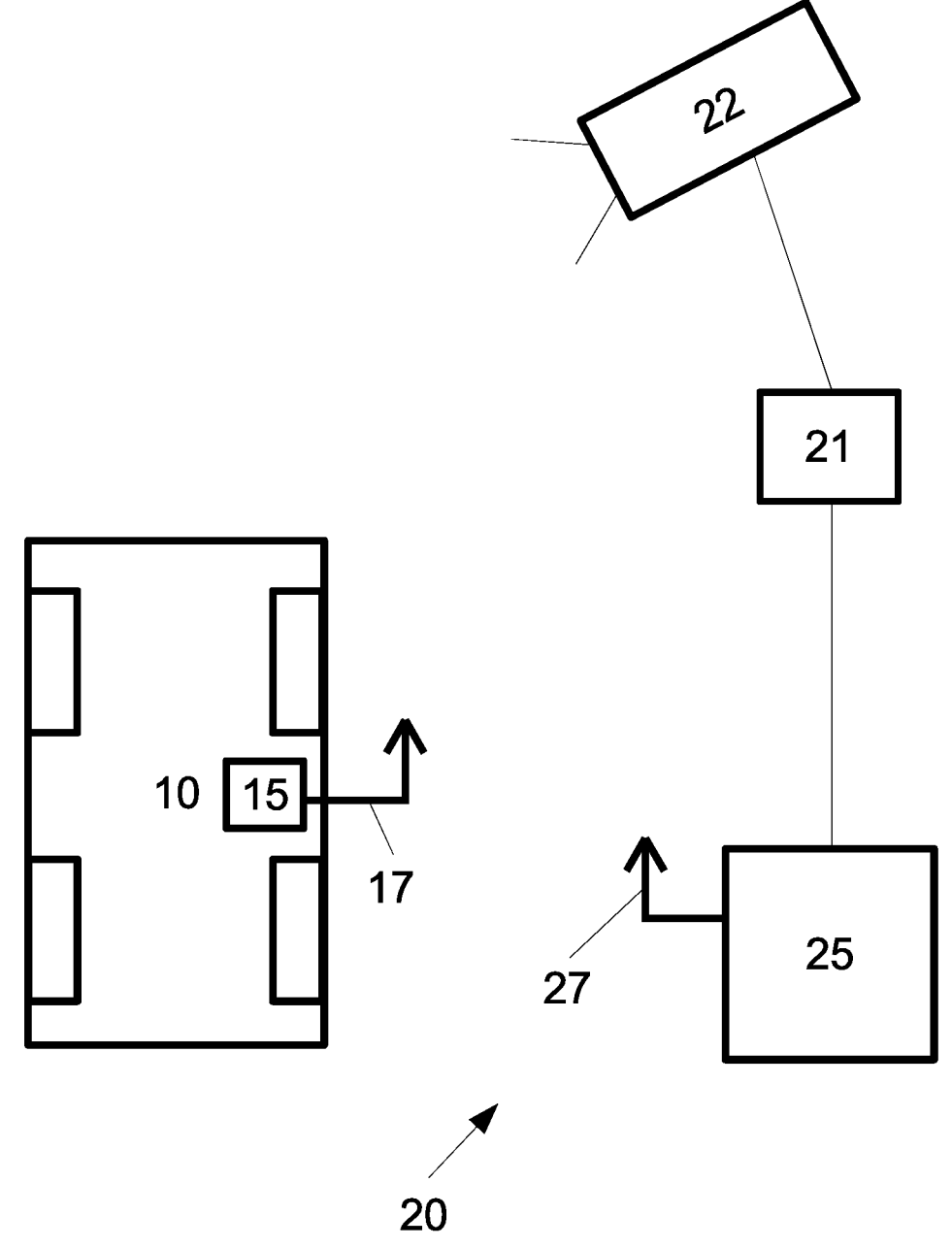

METHOD FOR AUTOMATICALLY CONTROLLING A VEHICLE

CROSS-REFERENCE TO RELATED APPLICATIONS

The present application is a National Stage Application under 35 U.S.C. § 371 of International Patent Application No. PCT/DE2022/200043 filed on Mar. 16, 2022, and claims priority from German Patent Application No. 10 2021 204 049.7 filed on Apr. 23, 2021, in the German Patent and Trademark Office, the disclosures of which are herein incorporated by reference in their entireties.

BACKGROUND

1. Field

Aspects and objects of embodiments of the present application relate to a method for automatically controlling a vehicle, in particular automatically controlling a vehicle on the basis of a driving specification.

2. Description of Related Art

Automatic control of a vehicle as part of a driving specification can be implemented as automatic valet parking (AVP), for example. This is a system in which a vehicle is parked in a parking garage and the occupants can get out. The vehicle is then steered to a free parking space by way of automatic control, which is at least substantially based on an infrastructure and a sensor system installed in the parking garage, and is parked in said parking space. When the occupants return and wish to take back their vehicle, the vehicle is likewise moved back to a transfer space.

Corresponding systems are currently being developed and standardized, for example in the context of the ISO 23374 standard. In this case, there is provision, in particular, for the vehicle itself to not necessarily need to have environment sensors in order to participate in the system. Accordingly, the vehicle must be able to rely on the infrastructure from which it receives driving specifications. If there are also other vehicles or persons in a parking garage, for example, it is important for the automatic control of the vehicle to be very reliable and to also be able to react quickly in the case of unforeseen events, for example triggered by careless persons.

SUMMARY

It is therefore an object of the application to provide a method for automatically controlling a vehicle that is of alternative or better design compared with known versions.

According to an aspect of an embodiment, a method for automatically controlling a vehicle includes: receiving a driving specification from an external infrastructure, in a normal mode, controlling the vehicle along a trajectory specified by the driving specification, in a test mode, controlling the vehicle along a test trajectory that deviates from the trajectory specified by the driving specification, and/or using test parameters.

Such a method can be used to intentionally bring about a state that deviates from the driving specification, and it is therefore possible to test whether the external infrastructure detects this. Accordingly, it is possible to verify whether the infrastructure is adequate for fault detection.

For example, the vehicle may be a motor vehicle, such as a car. The method can also be used for other vehicles, however. The driving specification can be received via a radio communication, for example. In particular, it can be continuously updated while the vehicle is moving. The external infrastructure may have sensors and/or cameras, for example, and can take this as a basis for creating the driving specification and sending it to the vehicle.

The normal mode is typically the mode the vehicle uses when it can be controlled normally by the infrastructure. The vehicle can switch to the test mode at certain times, for example as indicated later on. The test trajectory can deviate from the specified trajectory in an appropriate manner to verify detection. Test parameters can relate to certain functionalities of the vehicle, for example, such as an electrically operated tailgate or a lighting system, and this too should typically be detected by the external infrastructure.

Whether an error signal is received from the infrastructure is preferably verified during the test mode. This allows identification of whether the infrastructure responds to the deviation from the specified trajectory and/or to the test parameters.

The error signal may in particular include a fault report and/or a stop signal and/or a new trajectory and/or new waypoints. By way of example, a fault report may be an electronic message indicating a malfunction on the vehicle. A stop signal may call for an immediate stop. By way of example, a new trajectory may be such that it corrects a deviation. The same applies to new waypoints, which the vehicle can follow or which can define a new trajectory.

In particular, the vehicle can be stopped and/or an error message can be output if no error signal is received within a specified period of time in the test mode. If no such error signal is received, this typically indicates that the infrastructure is not working correctly, because it has not correctly detected the deviation from the specified trajectory and/or the use of the test parameters. In this case, it is appropriate to immediately stop the vehicle, as the infrastructure is evidently not working reliably.

In particular, the error message can be sent to the infrastructure via a radio connection and/or output by operating a visual and/or an audible warning device. Sending via a radio connection allows the infrastructure to be informed of its malfunction. Appropriate measures can then be taken, for example. A visual warning device may be hazard warning lights or another lighting device, for example. An audible warning device may be a horn, for example.

The error message may in particular contain information about a location of the vehicle and/or about a course of the vehicle and/or about the trajectory and/or about the test trajectory. This allows the information about the fault to be specified further to facilitate troubleshooting. Any combination or subcombination of the indicated values is possible, and other values can also be used.

The vehicle preferably switches to the normal mode after the error signal has been received. If the error signal is received, this means that the infrastructure has correctly detected the intentional abnormal behavior of the vehicle. The infrastructure is therefore reliable and it is possible to continue normally.

It should be mentioned that, according to the terminology used herein, the error signal is a signal that is sent from the infrastructure to the vehicle. By contrast, the error message is a message that is sent from the vehicle to the infrastructure.

The test parameters can specify opening of a tailgate or another element on the vehicle, switching-off of one or more lights of the vehicle and/or activation of hazard warning lights or one or more lights of the vehicle, for example. This too can typically be detected by the infrastructure, depending on the version, and it is thus possible to verify whether the detection is working correctly. A tailgate can be opened in particular in an area of a parking garage in which a necessary height for this is not available. Typically, opening of the tailgate is then stopped in time to prevent damage. However, in such a place, the infrastructure should pay particular attention to the opening of the tailgate actually being detected.

In particular, the vehicle can be controlled without using data from the vehicle's own environment sensors. Such sensors and their use and programming in this regard can thus be dispensed with.

According to one version, the vehicle is controlled using data from the vehicle's own environment sensors, wherein in particular a reaction of the infrastructure to the test mode is taken as a basis for changing the control in terms of the weighting of the environment sensors and the infrastructure. This allows the weighting to be matched to the reliability of the infrastructure. For example, it is possible to provide a parameter that can be adjusted and that specifies the degree to which the environment sensors and the degree to which the infrastructure is taken into account when controlling the vehicle.

In particular, the test trajectory can be defined using a random deviation from the trajectory. This can be accomplished using a random number generator, for example. The test trajectory can also be defined using a specified deviation from the trajectory. For example, this specified deviation may be permanently stored.

In particular, the vehicle can switch from the normal mode to the test mode at randomly selected times and/or at regular intervals.

It is also possible to take data from the vehicle's own environment sensors as a basis for determining when to switch to the test mode. This can be done in the following places, for example: In tight places; here, a fast reaction from the infrastructure is expected in particular. In places with poor visibility for the vehicle; here, a fast reaction is also expected. In places with a lot of space and no traffic; here, even a slow reaction can still be fine. In areas with people in the surroundings; here, a fast reaction is expected due to high hazard potential. In areas with poor lighting; here, a camera system can be checked in particular, or it is possible to check whether there is sufficient redundancy through other detection systems. In particular, this variant can be extended such that the parking garage turns off the light at random intervals and the reaction is verified.

The driving specification can in particular specify the trajectory by including the trajectory and/or waypoints. This permits practical specification of the trajectory.

According to an aspect of an embodiment, there is provided a vehicle control module configured to carry out a method as described herein. According to an aspect of an embodiment, there is provided a non-volatile, computer-readable storage medium on which program code is stored, during the execution of which a processor carries out a method as described herein. All the versions and variants of the respective method that are described herein can be used.

By way of example, an AVP type 2 system with a vehicle without environment sensors or a system design that does not require sensors in the vehicle can be considered as the starting position. The infrastructure typically detects the vehicle continuously, determines its position and sends appropriate waypoints to the vehicle so that said vehicle can maneuver into the planned parking position without danger.

By way of example, the vehicle can now deliberately deviate from the specified course at irregular intervals. If the infrastructure works as planned, a new specification of waypoints for the vehicle or another vehicle guidance command, such as a stop signal, is provided within a specified time. If this is not the case, the vehicle stops automatically, for example, because it can be assumed that the infrastructure is not working as planned or as necessary. A signal can then be sent to report the fault. The signal, for example a radio signal, can be sent in particular using vehicle-to-X communication or 3G/4G/5G/etc. or using Bluetooth, UWB (ultra-wideband) or WLAN or using another radio technology. It can also be sent by means of visual or audible means (e.g. horn or hazard warning lights). In the case of a radio signal, it is additionally possible to also send the information regarding the place at which the deliberate deviation occurred, in what form, so that subsequent troubleshooting becomes easier.

If the vehicle is equipped with environment sensors, it can select the deviation from the specified path in such a way that certain boundary conditions are checked more accurately. In this respect, it is apt to refer to the examples already mentioned earlier.

Instead of or in addition to deviations from the path, further deviations from the target state can also be carried out by the vehicle in order to check a reaction from the infrastructure. For example, the vehicle can open an electrically operated tailgate, but ideally not only in a place where the height would no longer be sufficient to drive with the tailgate open. The expectation is that the infrastructure system will send a stop signal. The vehicle can also turn off the lights, the expectation being that the infrastructure system will send a stop signal. The vehicle can also activate the hazard warning lights, the expectation here too being that the infrastructure system will send a stop signal.

The system can also be used in an AVP type 3 system, where the vehicle and the infrastructure share the guidance task. Here, the check can additionally be used to allow the vehicle to decide to what extent the information from the infrastructure is incorporated into the vehicle guidance and how much the vehicle relies solely on its environment sensors.

In particular, it is possible to check the correct operation of the infrastructure system without additional sensors.

Apart from in vehicles which are designed as normal passenger cars, the method described herein can be used, for example, in port logistics, at an airport, in logistics in factory buildings or on premises using autonomously moving platforms, in mobile robots or other units.

BRIEF DESCRIPTION OF THE DRAWINGS

The application will now be described on the basis of the drawing, which shows an arrangement comprising a vehicle and an infrastructure.

DETAILED DESCRIPTION

The FIGURE shows a vehicle 10 and an infrastructure 20. This is a purely schematic representation, which is used hereinbelow to describe aspects of the functionality.

The vehicle 10 has a communication module 15, to which an antenna 17 is connected. This allows it to communicate with the infrastructure 20. Environment sensors on the vehicle 10 are not required, at least according to one version.

The infrastructure 20 has a central computing unit 21, which performs central control tasks. The infrastructure 20 has a camera 22, which observes the vehicle 10. Typically, multiple such cameras and/or other sensors are also present; the camera 22 is used only as an example here. The infrastructure 20 furthermore has a communication module 25, to which an antenna 27 is also connected. The vehicle 10 moves through an area that is controlled by the infrastructure 20. For this purpose, it receives driving specifications, which contain trajectories or from which at least trajectories can be extracted, via the communication modules 25, 15. The vehicle 10 follows these trajectories in a normal mode and is monitored by the infrastructure 20 in the process.

At certain times, for example at times specified by a random number generator, the vehicle 10 deviates from the specified trajectory at random. It then waits for a specified period of time to ascertain whether it receives a fault report from the infrastructure 20. This can include a stop signal or a new trajectory, for example. If such a fault report is received, the vehicle 10 establishes that the infrastructure 20 is working properly and returns to the normal mode. If such a fault report is not received within a specified time, the vehicle 10 must assume that the infrastructure 20 is not performing the monitoring tasks correctly. It will therefore typically stop and send an error message containing information about the fault. This allows protection against property damage or personal injury possibly arising as a result of the vehicle 10 otherwise travelling onward.

Other parameters can also be varied by the vehicle 10, for example hazard warning lights can be switched on or a tailgate can be opened. The correct reaction of the infrastructure 20 can be verified in this case too.

In general, it should be pointed out that vehicle-to-X communication is understood to mean in particular a direct communication between vehicles and/or between vehicles and infrastructure devices. By way of example, it may thus be vehicle-to-vehicle communication or vehicle-to-infrastructure communication. By way of example, a vehicle-to-X communication can be effected using the IEEE 802.11p or IEEE 1609.4 standard. Other examples of communication technologies include LTE-V2X, 5G-V2X, C-V2X, WLAN, WiMax, UWB or Bluetooth. A vehicle-to-X communication can also be referred to as C2X communication. The subareas can be referred to as C2C (car-to-car) or C2I (car-to-infrastructure). However, the embodiment does not exclude vehicle-to-X communication with switching via a mobile radio network, for example.

Steps of the method according to the embodiment that have been mentioned can be carried out in the indicated order. However, they can also be carried out in a different order, if technically useful. One of the versions of the method according to the embodiment can be carried out with a specific combination of steps, for example, in such a way that no further steps are carried out. However, further steps can also be carried out in principle, even those that are not mentioned.

It is pointed out that features may be described in combination in the claims and in the description, for example in order to facilitate understanding, even though they can also be used separately from one another. A person skilled in the art will recognize that such features, independently of one another, can also be combined with other features or combinations of features.

Dependency references in dependent claims may characterize preferred combinations of the respective features but do not exclude other combinations of features.

The invention claimed is:

1. A method for controlling a vehicle, the method comprising:

receiving a driving specification from an external infrastructure;

controlling the vehicle along a trajectory specified by the driving specification;

controlling the vehicle along a test trajectory that deviates from the trajectory specified by the driving specification; and performing a check to determine whether an error signal is received from the infrastructure, wherein the vehicle is stopped and/or an error message is output if no error signal is received when controlling the vehicle along the test trajectory within a specified period of time.

2. The method as claimed in claim 1, wherein the error signal includes a fault report and/or a stop signal and/or a new trajectory and/or new waypoints.

3. The method as claimed in claim 1, wherein the error message is sent to the infrastructure via a radio connection and/or is output by operating a visual and/or an audible warning device.

4. The method as claimed in claim 3, wherein the error message contains information about a location of the vehicle and/or about a course of the vehicle and/or about the trajectory and/or about the test trajectory.

5. The method as claimed in claim 4, wherein the vehicle switches to controlling the vehicle along the trajectory after receiving the error signal.

6. The method as claimed in claim 5, wherein the driving specification specifies opening of a tailgate or another element on the vehicle, switching-off of one or more lights of the vehicle, and/or activating hazard warning lights or one or more lights of the vehicle.

7. The method as claimed in claim 6, wherein the vehicle is controlled without using data from the vehicle's own environment sensors.

8. The method as claimed in claim 1, wherein the vehicle is controlled using data from the vehicle's own environment sensors, and wherein a reaction of the infrastructure to operating the vehicle along the test trajectory is taken as a basis for changing the control in terms of the weighting of the environment sensors and the infrastructure.

9. The method as claimed in claim 8, wherein the test trajectory is defined using a random deviation from the trajectory.

10. The method as claimed in claim 9, wherein the test trajectory is defined using a specified deviation from the trajectory.

11. The method as claimed in claim 10, wherein the vehicle switches from operating along the trajectory to operating along the test trajectory at randomly selected times and/or at regular intervals.

12. The method as claimed in claim 11, wherein data from the vehicle's own environment sensors are taken as a basis for determining when to switch to operating the vehicle along the test trajectory.

13. The method as claimed in claim 12, wherein the driving specification specifies the trajectory by including the trajectory and/or waypoints.

* * * * *